United States Patent Office 3,058,719
Patented Oct. 16, 1962

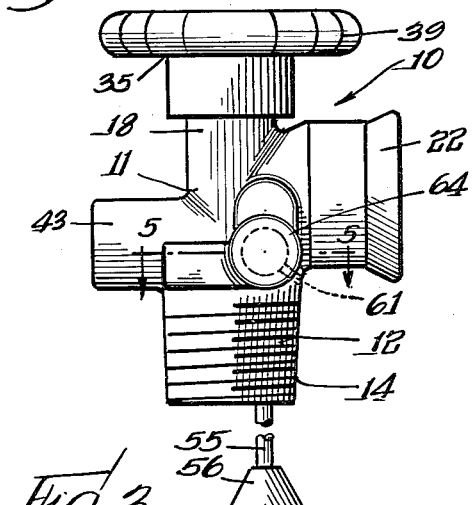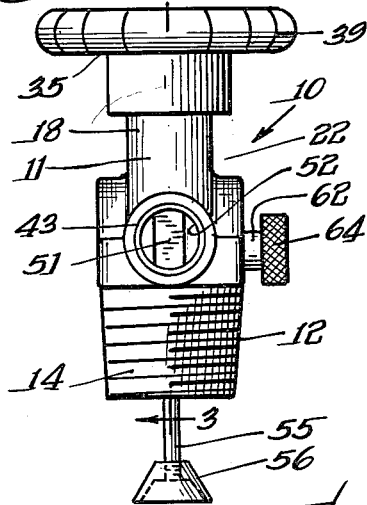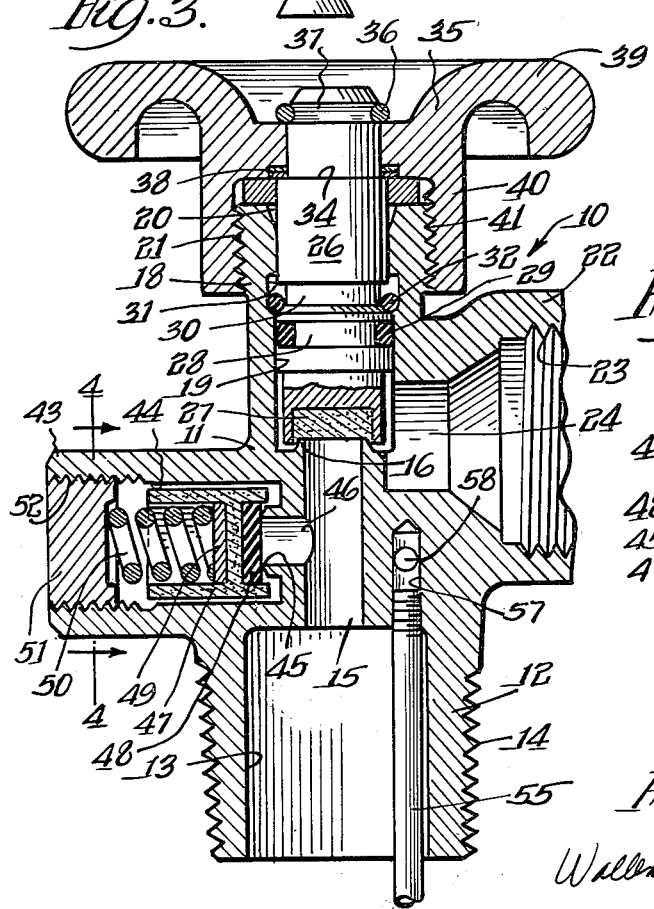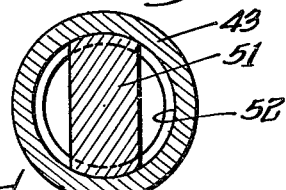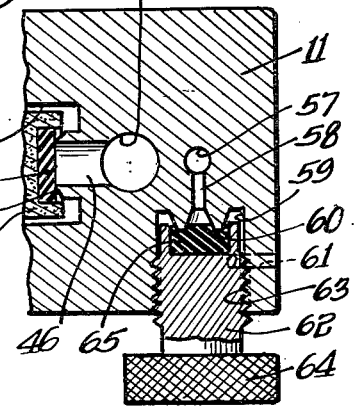
INVENTOR.
Frederick L. Beebee

3,058,719
FLUID CONTROL VALVE
Frederick L. Beebee, La Canada, Calif., assignor to Selwyn Pacific Company, Los Angeles, Calif., a corporation of California
Filed Mar. 15, 1960, Ser. No. 15,151
5 Claims. (Cl. 251—273)

The principal object of this invention is to provide an improved fluid control valve and this invention is directed more particularly to the provision of such a valve for use with cylinders containing gas, such as liquified petroleum gas or the like.

Briefly, the fluid control valve of this invention includes a valve body having a fluid passage therein provided with a valve seat, and a bonnet provided with a bore in alignment with the valve seat. Preferably, the fluid passage includes a first passage extending from the end of the valve body which is secured to the gas containing cylinder in alignment with the bore in the bonnet and terminating in the valve seat, and also a second passage communicating with the valve seat and the bore.

A valve plug extends into the bonnet and is slidable in the bore thereof for engaging and disengaging the valve seat to open and close the fluid passage. Means are provided for sealing the valve plug against leakage therealong through the bonnet of the valve body and, preferably, consists of a toroidal O-ring carried by the valve plug and engaging the bore in the bonnet. Means are also provided for preventing withdrawal of the valve plug from the bore in the bonnet but still allow free longitudinal movement of the valve plug in the bore, this means preferably comprising a spring snap ring loosely received in annular grooves in the valve plug and the bore in the bonnet.

A handwheel is carried by the outer end of the valve plug and it has a depending skirt provided with internal screw threads which engage external screw threads formed on the bonnet of the valve body. When the handwheel is rotated in one direction, the valve plug is pushed to the valve closed position, and when the handwheel is rotated in the opposite direction, the valve plug is pulled to the valve open position. By providing external screw threads on the bonnet of the valve body and internal screw threads on the handwheel, an extremely compact valve assembly is provided, the overall dimensions of the valve are maintained at a minimum, and fewer parts and less machining are required, thereby also providing a low cost valve of rugged construction and fool proof operation.

Preferably, the handwheel is rotatably secured to the valve plug so that the valve plug may be longitudinally slid in the bore in the bonnet without turning on its own axis. This assures smooth and easy movement of the valve plug in the bonnet bore and greatly reduces wear on the toroidal O-ring sealing means and the valve plug seating element which engages and disengages the valve seat. Long useful life of the valve of this invention is assured.

The spring snap ring which prevents removal of the valve plug from the bonnet bore is effective to prevent blowing of the valve plug from the bonnet due to excessive pressure in the gas cylinders even though the threads on the bonnet and handwheel should be disengaged, an extremely important safety feature. The valve plug cannot be dislodged even with pressure of 5,000 pounds per square inch.

The valve of this invention is particularly adaptable for use with the smaller type gas cylinders, such as 40 pound propane cylinders used in the home, and due to its construction and ease of operation it may be readily manipulated by the housewife. The valve is also preferably provided with a poppet type pressure relief valve which may start discharging at a relief setting of 375 pounds per square inch and have a relief capacity up to 40 pounds of propane. The valve may also be provided with a so called 10% valve and dip tube assembly to form an outgage for indicating when the cylinder is substantially empty.

Other objects of this invention reside in the details of construction of the fluid control valve and in the cooperative relationships between the component parts thereof.

Other objects and advantages of this invention will become apparent to those skilled in the art upon reference to the accompanying specification, claims and drawing in which:

FIG. 1 is an elevational view of the fluid control valve of this invention.

FIG. 2 is also an elevational view of the control valve as it appears from the left of FIG. 1.

FIG. 3 is an enlarged vertical sectional view through the control valve taken substantially along the line 3—3 of FIG. 2.

FIG. 4 is a vertical sectional view through a portion of the control valve and is taken substantially along the line 4—4 of FIG. 3.

FIG. 5 is a horizontal sectional view of a portion of the control valve taken substantially along the line 5—5 of FIG. 1.

The fluid control valve of this invention is generally designated at 10 and it includes a valve body 11 formed of brass or the like. The valve body 11 has a downwardly extending end portion 12 provided with a central opening 13 and external screw threads 14 by which the valve body is screwed into and secured to a cylinder containing a gas, such as a liquified petroleum gas or the like, propane being a typical example of such gas. The central opening 13 communicates with the gas within the cylinder. A first fluid passage 15 extends upwardly through the valve body 11 from the opening 13 and terminates in an upwardly facing valve seat 16.

The upper end of the valve body 11 comprises a bonnet 18 which is provided with a central bore 19 in vertical alignment with the first passage 15 and valve seat 16. The surface of the bore 19 is preferably highly polished as by reaming and burnishing and the top of the bore 19 is preferably tapered as indicated at 20. The bonnet 18 is provided with external screw threads 21.

The valve body 11 is also provided with a laterally extending service portion 22 which is provided with an internally threaded opening 23 which communicates through a second passage 24 with the valve seat 16 and the bore 19. When the valve is opened, gas is discharged through the second passage 24 and screw threaded opening 23 to the usual gas utilizing appliances or the like. The first and second passages 15 and 24 form a fluid passage through the valve body 11, which passage is closed and opened by a valve element engaging and disengaging the valve seat 16.

A valve plug 26, which is preferably formed of brass or the like extends through the bonnet 18 and is slidably mounted in the bore 19. The lower end of the valve plug 26 has a valve element 27 secured therein, the valve element 27 being preferably formed from nylon or the like. The valve element 27, upon movement of the valve plug 26 engages and disengages the seat 16 for closing and opening the fluid passage through the valve. The valve plug 26 is provided with a first groove 28 which carries a toroidal O-ring 29 which in turn engages the polished bore 19 in the bonnet, the O-ring operating effectively to seal against leakage along the valve plug 26 through the bore 19. Because the toroidal O-ring, which may be formed of suitable conventional materials, has little area exposed to pressure, the sliding of the valve plug 26 in the bore 19 is free and easy. This floating toroidal O-ring seal eliminates stem leakers caused by broken seals in conventional valves. As the valve plug 26 is being moved between open and closed positions, the toroidal O-ring rolls about itself under compression along the polished surface of the bore 19, making a constant unstrained seal against gas leakage.

The valve plug 26 is also provided with a second annular groove 30 which carries a spring snap ring 32 which in turn rides in an annular groove 31 formed in the bore 19. The widths of the annular grooves 30 and 31 are greater than the thickness of the spring snap ring 32 so that limited longitudinal movement of the valve plug 26 is permitted. When the valve plug 26 is inserted into the bore 19, the tapered portion 20 of the bore 19 compresses the spring snap ring to allow downward movement of the valve plug, and when the spring snap ring 32 reaches the annular groove 31, it expands into the same and, as a result, it is thereafter impossible to remove the valve plug 26 from the bonnet 18. In fact, the valve plug cannot be dislodged from the bonnet even with pressures of 5,000 pounds per square inch being inserted thereon.

A handwheel 35 is rotatably mounted on the valve plug 26 externally of the bonnet 18 and it is secured on the valve plug 26 between a shoulder 34 formed on the valve plug 26 and a spring snap ring 36 received in a third annular groove 37 in the valve plug 26. Washer means 38 preferably in the form of two washers are interposed between the handwheel 35 and the shoulder 34 so as to provide for relatively free turning of the handwheel about the valve plug 26. The handwheel 35 has an easy grip rim portion 39 so that it may be readily rotated. The handwheel 35 is also provided with a depending skirt 40 having internal screw threads 41 which engage the external screw threads 21 on the bonnet 18. The single piece handwheel is preferably cast from a suitable alloy so as to provide strength and corrosion-free performance.

When the handwheel 35 is rotated in one direction, the cooperating screw threads 21 and 41 cause the handwheel to push the valve plug 26 through the washer means 38 and shoulder 34 to slide the valve plug 26 to the closed position. When the handwheel is rotated in the opposite direction, the handwheel pulls the valve plug 26 through the spring snap ring 36 to slide the valve plug 26 to opened position. Because the handwheel 35 is rotatably mounted on the valve plug 26, the valve plug 26 is not rotated by the rotation of the handwheel 35 and, consequently, the movement of the valve plug 26 is substantially linear sliding movement. Since the valve plug 26 is not forcefully turned, the O-ring is not worn by turning motion or is the valve element 27 abraded by turning motion. Long life of the valve of this invention is, therefore, assured. By reason of the internal threads 41 on the handwheel 35 and the external threads 21 on the bonnet 18, the overall height of the valve of this invention is maintained at a minimum, the valve being approximately 2½ inches in height when the valve is closed. This represents more than a 33% decrease in overall height as compared to conventional valves of the same capacity and this makes possible increased savings to the cylinder manufacturers by allowing decreases in the height and diameter of the collars of the cylinders.

The valve of this invention is also preferably provided with a lateral extension 43 having a bore 44, a valve seat 45 and a passage 46 communicating with the first passage 15 below the valve seat 16. A safety poppet member 47 having laterally extending ears is slidably mounted in the bore 44, the ears providing clearance around the poppet member. The poppet member 47 carries a valve element 48 which engages the seat 45, the valve element 48 being formed of suitable valve seating material. A washer 49 is carried within the poppet member 47 and it is engaged by one end of a spring 50, the other end of which is engaged by a rectangular plug 51 screw threadedly received in screw threads 52 in the bore 44. The spring 50 operates to hold the valve element 48 against the seat 45 but if the pressure in the gas cylinder should rise above a predetermined value, such as 375 pounds per square inch, the valve element 48 and the poppet member 47 will be moved away from the valve seat 45 against the action of the spring 50 to relieve any excess pressure which might occur in the gas cylinder.

A dip tube assembly including a tube 55 having a flared end 56 extends through the opening 13 in the valve body 11 and is screw threadedly secured in a tapered bore 57 in the valve body. The tube 55 extends downwardly into the gas cylinder to a point where the flared end 56 thereof is adjacent the bottom of the cylinder. The bore 57 is connected by a lateral bore 58 to a chamber 59 having a valve seat 60. Another bore 61 connects this chamber 59 to the outside of the valve body 11. A screw member 62 having a knurled head 64 is screw threadedly received, as indicated at 63, in the chamber 59. The inner end of the screw member 62 is provided with a valve element 65 which is adapted to engage and disengage the valve seat 60. When the screw member 62 is unscrewed to move the valve element 65 away from the valve seat 60, the interior of the cylinder is communicated through the dip tube assembly and the bore 61 to the exterior of the valve body 11. If there is liquid propane within the cylinder, it will be forced out under pressure through the bore 61, the dip tube assembly thereby acting as an outgage for indicating the presence of the liquid propane. If, however, the liquid propane level is so low that the gas thereabove passes through the dip tube assembly, then the issuance of gas instead of liquid through the bore 61 indicates that the cylinder is substantially empty.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A fluid control valve comprising, a single piece valve body having a fluid passage therein provided with a valve seat, and a bonnet provided with a bore communicating with the fluid passage and in alignment with the valve seat, a valve plug insertable through the outer end of the bonnet bore and extending into the bonnet and slidable in the bore and having at its inner end a valve element for engaging and disengaging the valve seat to open and close the fluid passage, said valve plug having a first annular groove therein, a toroidal O-ring in said first annular groove and insertable through the outer end of the bonnet bore and engaging the bore in the valve body for sealing the valve plug against leakage therealong through the bonnet of the valve body, said valve plug having a second annular groove therein and the bore in the valve body having an annular groove adjacent said second annular groove in the valve plug, a spring snap ring insertable through the outer end of the bonnet bore and received in said second annular groove in the valve plug and in said annular groove in the bore in the valve body and being of less thickness that the width of said annular grooves to allow sliding of the valve plug in the bore between valve closed and opened positions, the end of said annular groove in the bore, farthest removed from said valve seat, being so constructed that it cooperates with the snap ring to prevent withdrawal of the valve plug from the bonnet of the valve body, said bonnet of the valve body having external screw threads thereon and said valve plug having a shoulder thereon and a third annular groove therein beyond the bonnet of the valve body, a handwheel rotatably mounted on the outer end of the valve plug between the shoulder and the third annular groove, washer means interposed between the handwheel and the shoulder on the valve plug, and a second spring snap ring received in said third annular groove and rotatably securing the handwheel on the valve plug between the second spring snap ring and the shoulder, and said handwheel having a depending skirt provided with internal screw threads engaging the external screw threads of the bonnet of the valve body so that when the handwheel is rotated in one direction, the handwheel pushes the valve plug through the washer means and shoulder to slide the valve plug to closed position, and so that when the handwheel is rotated in the opposite direction, the handwheel pulls the valve plug through the second spring snap ring to slide the valve plug to opened position.

2. A valve for gas containing cylinders or the like comprising, a single piece valve body having securing means at one end of the valve body for securing the valve body to the cylinder or the like, a bonnet at the other end of the valve body, a first fluid passage in the valve body extending from the securing end of the valve body and terminating in a valve seat facing the bonnet of the valve body, a second fluid passage in the valve body communicating with the valve seat, and a bore extending through the bonnet of the valve body and in alignment with and communicating with the valve seat, a valve plug insertable through the outer end of the bonnet bore and extending into the bonnet and slidable in the bore and having at its inner end a valve element for engaging and disengaging the valve seat to open and close the fluid passage, said valve plug having a first annular groove therein, a toroidal O-ring in said first annular groove and insertable through the outer end of the bonnet bore and engaging the bore in the valve body for sealing the valve plug against leakage therealong through the bonnet of the valve body, said valve plug having a second annular groove therein and the bore in the valve body having an annular groove adjacent said second annular groove in the valve plug, a spring snap ring insertable through the outer end of the bonnet bore and received in said second annular groove in the valve plug and in said annular groove in the bore in the valve body and being of less thickness than the width of said annular grooves to allow sliding of the valve plug in the bore between valve closed and opened positions, the end of said annular groove in the bore, farthest removed from said valve seat, being so constructed that it cooperates with the snap ring to prevent withdrawal of the valve plug from the bonnet of the valve body, said bonnet of the valve body having external screw threads thereon and said valve plug having a shoulder thereon and a third annular groove therein beyond the bonnet of the valve body, a handwheel rotatably mounted on the outer end of the valve plug between the shoulder and the third annular groove, washer means interposed between the handwheel and the shoulder on the valve plug, and a second spring snap ring received in said third annular groove and rotatably securing the handwheel on the valve plug between the second spring snap ring and the shoulder, and said handwheel having a depending skirt provided with internal screw threads engaging the external screw threads of the bonnet of the valve body so that when the handwheel is rotated in one direction, the handwheel pushes the valve plug through the washer means and shoulder to slide the valve plug to closed position, and so that when the handwheel is rotated in the opposite direction, the handwheel pulls the valve plug through the second spring snap ring to slide the valve plug to opened position.

3. A fluid control valve comprising, a single piece valve body having a fluid passage therein provided with a valve seat, and a bonnet provided with a bore communicating with the fluid passage and in alignment with the valve seat, a valve plug insertable through the outer end of the bonnet bore and extending into the bonnet and slidable in the bore for engaging and disengaging the valve seat to open and close the fluid passage, means for sealing the valve plug against leakage therealong through the bonnet of the valve body, said valve plug having an annular groove therein and the bore in the valve body having an annular groove therein adjacent the annular groove in the valve plug, a spring snap ring insertable through the outer end of the bonnet bore and received in the annular groove in the valve plug and in the annular groove in the bore in the valve body and being of less thickness than the width of said annular grooves to allow sliding of the valve plug in the bore between valve closed and opened position, the end of said annular groove in the bore, farthest removed from said valve seat, being so constructed that it cooperates with the snap ring to prevent withdrawal of the valve plug from the bore in the bonnet of the valve body, a handwheel carried by the outer end of the valve plug and having a depending skirt provided with internal screw threads, and said bonnet being provided with external screw threads engaged by the internal screw threads of the handwheel so that when the handwheel is rotated in one direction, the valve plug is is moved to valve closed position, and so that when the handwheel is rotated in the opposite direction, the valve plug is moved to valve opened position.

4. A fluid control valve comprising, a single piece valve body having a fluid passage therein provided with a valve seat, and a bonnet provided with a bore communicating with the fluid passage and in alignment with the valve seat, a valve plug insertable through the outer end of the bonnet bore and extending into the bonnet and slidable in the bore for engaging and disengaging the valve seat to open and close the fluid passage, a toroidal O-ring carried by the valve plug and insertable through the outer end of the bonnet bore and engaging the bore in the bonnet for sealing the valve plug against leakage therealong through the bonnet of the valve body, said valve plug having an annular groove therein and the bore in the valve body having an annular groove therein adjacent the annular groove in the valve plug, a spring snap ring insertable through the outer end of the bonnet bore and received in the annular groove in the valve plug and in the annular groove in the bore in the valve body and being of less thickness than the width of said annular grooves to allow sliding of the valve plug in the bore between valve closed and opened positions, the end of said annular groove in the bore, farthest removed from said valve seat, being so constructed that it cooperates with the snap ring to prevent withdrawal of the valve plug from the bore in the bonnet of the valve body, a handwheel carried by the outer end of the valve plug and having a depending skirt provided with internal screw threads, and said bonnet being provided with external screw threads engaged by the internal screw threads of the handwheel so that when the handwheel is rotated in one direction, the valve plug is moved to valve closed position, and so that when the handwheel is rotated in the opposite direction, the valve plug is moved to valve opened position.

5. A fluid control valve comprising, a single piece valve body having a fluid passage therein provided with a valve seat, and a bonnet provided with a bore communicating with the fluid passage and in alignment with the valve seat, a valve plug insertable through the outer end of the bonnet bore and extending into the bonnet and slidable in the bore for engaging and disengaging the valve seat to open and close the fluid passage, a toroidal O-ring carried by the valve plug and insertable through the outer end of the bonnet bore and engaging the bore in the bonnet for sealing the valve plug against leakage therealong through the bonnet of the valve body, said valve plug having an annular groove therein and the bore in the valve body having an annular groove therein adjacent the annular groove in the valve plug, a spring snap ring insertable through the outer end of the bonnet bore and received in the annular groove in the valve plug and in the annular groove in the bore in the valve body and being of less thickness than the width of said annular grooves to allow sliding of the valve plug in the bore between valve closed and opened positions, the end of said annular groove in the bore, farthest removed from said valve seat, being so constructed that it cooperates with the snap ring to prevent withdrawal of the valve plug from the bore in the bonnet of the valve body, a handwheel rotatably mounted on the other end of the valve plug and secured against longitudinal movement with respect thereto and having a depending skirt provided with internal screw threads, and said bonnet being provided with external screw threads engaged by the internal screw threads of the handwheel so that when the handwheel is rotated in one direction, the handwheel pushes the valve plug to slide the valve plug to closed position, and so that when the handwheel is rotated in the opposite direction, the hand wheel pulls the valve plug to slide the valve plug to opened position.

References Cited in the file of this patent

UNITED STATES PATENTS

| | | |
|---|---|---|
| 2,310,558 | Teeters | Feb. 9, 1943 |
| 2,583,291 | Beem | Jan. 22, 1952 |

FOREIGN PATENTS

| | | |
|---|---|---|
| 323,304 | Italy | Dec. 15, 1934 |
| 1,108,402 | France | Aug. 31, 1955 |